United States Patent [19]

Christiansen et al.

[11] Patent Number: 4,542,267
[45] Date of Patent: Sep. 17, 1985

[54] AUTOMATED CLOSURE SYSTEM FOR NUCLEAR REACTOR FUEL ASSEMBLIES

[75] Inventors: David W. Christiansen, Kennewick; William F. Brown, West Richland, both of Wash.

[73] Assignee: The United States of America as represented by the United States Department of Energy, Washington, D.C.

[21] Appl. No.: 445,620

[22] Filed: Nov. 30, 1982

[51] Int. Cl.4 ............................................. H05B 6/10
[52] U.S. Cl. ................................... 219/9.5; 219/10.57; 219/8.5; 219/10.69; 219/85 A
[58] Field of Search ............... 219/9.5, 8.5, 10.57, 219/10.69, 10.67, 85 A, 59.1, 137 R; 376/451, 452, 412, 414, 415, 416

[56] References Cited

U.S. PATENT DOCUMENTS

| | | | |
|---|---|---|---|
| 3,699,297 | 10/1972 | Grin et al. | 219/9.5 |
| 3,725,635 | 4/1973 | Fink et al. | 376/451 X |
| 3,828,518 | 8/1974 | Silk et al. | |
| 3,963,566 | 6/1976 | MacMillan et al. | 376/451 X |
| 4,063,962 | 12/1977 | Arya et al. | |
| 4,075,454 | 2/1978 | Duncan et al. | 219/137 R |
| 4,152,566 | 5/1979 | Mägerle | 219/10.69 X |
| 4,174,938 | 11/1979 | Cellier | |
| 4,332,997 | 6/1982 | Dudko et al. | 219/9.5 |

Primary Examiner—Philip H. Leung
Attorney, Agent, or Firm—Edward W. Nypaver; Robert Southworth, III; Judson R. Hightower

[57] ABSTRACT

A welder for automated closure of fuel pins by a pulsed magnetic process in which the open end of a length of cladding is positioned within a complementary tube surrounded by a pulsed magnetic welder. Seals are provided at each end of the tube, which can be evacuated or can receive tag gas for direct introduction to the cladding interior. Loading of magnetic rings and end caps is accomplished automatically in conjunction with the welding steps carried out within the tube.

3 Claims, 10 Drawing Figures

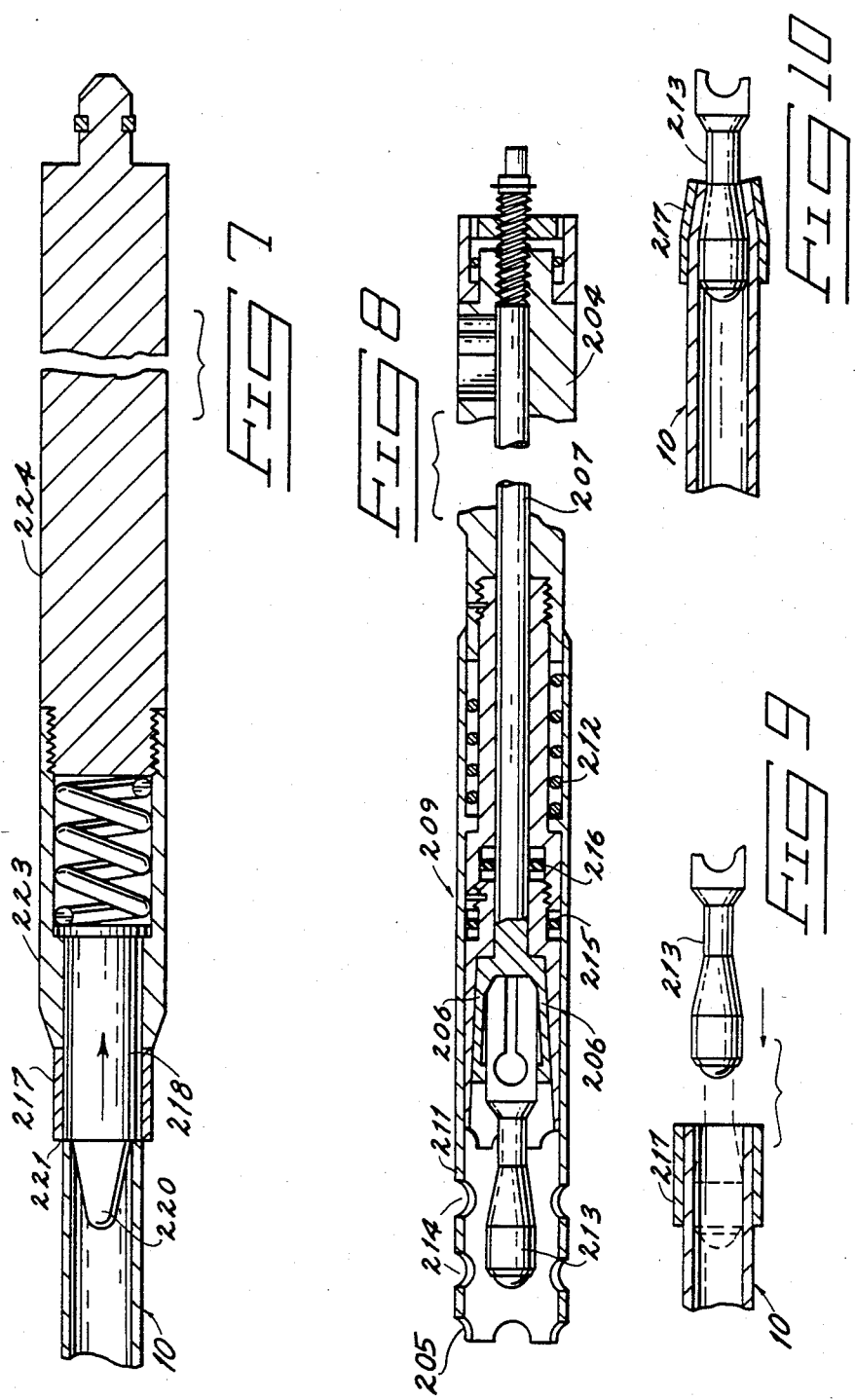

AUTOMATED CLOSURE SYSTEM FOR NUCLEAR REACTOR FUEL ASSEMBLIES

The U.S. government has rights in this invention pursuant to Contract DE-AC14-76FF02170 between the U.S. Department of Energy and Westinghouse Electric Corporation.

BACKGROUND OF THE INVENTION

The present invention relates generally to automated loading of fuel assemblies for nuclear reactors. It comprises an apparatus for automatically welding end caps to cladding after the fuel pins have been filled and cleaned.

This disclosure relates to the assembly of nuclear fuel assemblies, particularly for use in fast breeder reactors. The present state of the art involves fabrication of fuel assemblies by manual manipulation or by mechanical processes incapable of limiting spread of radioactive contamination to adjoining components and equipment. In such configurations, the fabrication steps are time consuming and create significant radiation contamination control problems.

To achieve flexibility of process steps, radiation contamination control, and efficient fabrication in an apparatus having production capability, the present invention has been directed toward development of a self-contained automated loading system. It allows for system variation and contamination control without degrading production capability. More specifically, the present apparatus permits fabrication and final welding of fuel assemblies by batch processing methods, using equipment which can be physically and environmentally isolated as required.

A large scale system for manufacturing nuclear fuel pellets is disclosed in U.S. Pat. No. 4,174,938. The system includes process components arranged vertically and providing for gravity flow of the product from one component to the next. The various process components are modular and each can be removed without interfering with the others. Physical isolation of the components is provided by appropriate seals and manual access is accomplished through glove ports. Another large scale system for cleaning nuclear fuel elements is shown in U.S. Pat. No. 4,063,962. Batches of fuel elements are suspended vertically and moved through the components of the system. Airlocks and seals are provided to contain contamination.

U.S. Pat. No. 3,828,518 discloses a welding apparatus for closing the end of a fuel rod by use of a rotating electrode head.

SUMMARY OF THE INVENTION

It is an object of this invention to effectively merge pulse magnetic welding techniques with a batch system for automatically filling and inerting fuel pins.

Another object of this invention is to provide a system in which the various work stations and subsystems are modular. They can be duplicated when required by production quotas, and individual components can be removed or substituted as necessitated by servicing and repair schedules.

Another object of the invention is to provide an integrated system for fabricating fuel pins which can be totally automated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention as embodied and broadly described herein, the apparatus of this invention may comprise a pulse magnetic welding apparatus located within a sealed chamber. The open end of the cladding of a loaded fuel pin is positionable within the welder and a ring of curie material is collapsed about it to cold weld the cladding about a pre-fitted end cap designed to accommodate this welding technique. Tag gas can be directly added to the fuel pin interior if desired.

BRIEF DESCRIPTION OF THE DRAWINGS

The accompanying drawings, which are incorporated into and form a part of the specification, illustrate several embodiments of the present invention and, together with the description, serve to explain the principles of the invention. In the drawings:

FIG. 7 is an enlarged axial sectional view through a ring loader;

FIG. 8 is an enlarged axial sectional view through an end cap loader;

FIG. 9 is a schematic view illustrating insertion of an end cap; and

FIG. 10 is a similar view after the pulse magnetic welding sequence.

DETAILED DESCRIPTION OF THE INVENTION

This invention is directed to an automated fuel pin loading system for nuclear reactors. It is directed specifically toward automated fuel pin production with maximized protection against spread of contamination.

Figure 1:
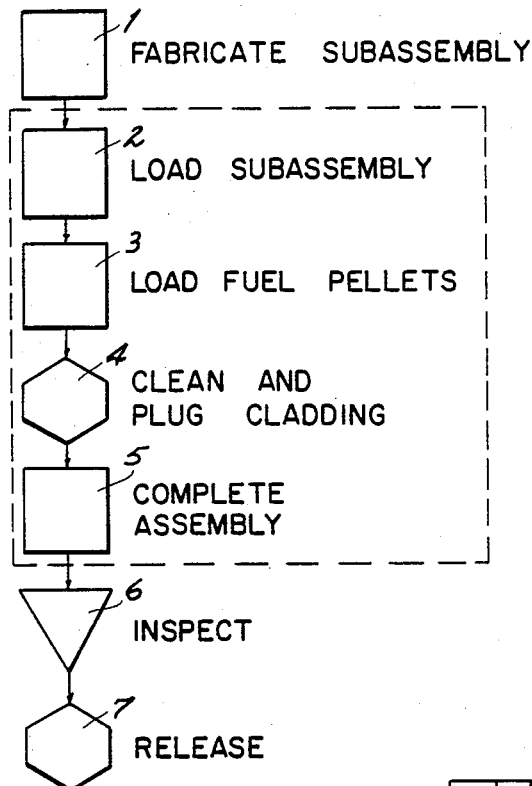
FIG. 1 is a simplified flow diagram of the system.

FIG. 1 shows the general flow path for fuel pin fabrication. The boxes bounded by dashed lines represent components of the potentially contaminated automated fuel pin loading system which is the subject of this disclosure.

Figure 2:
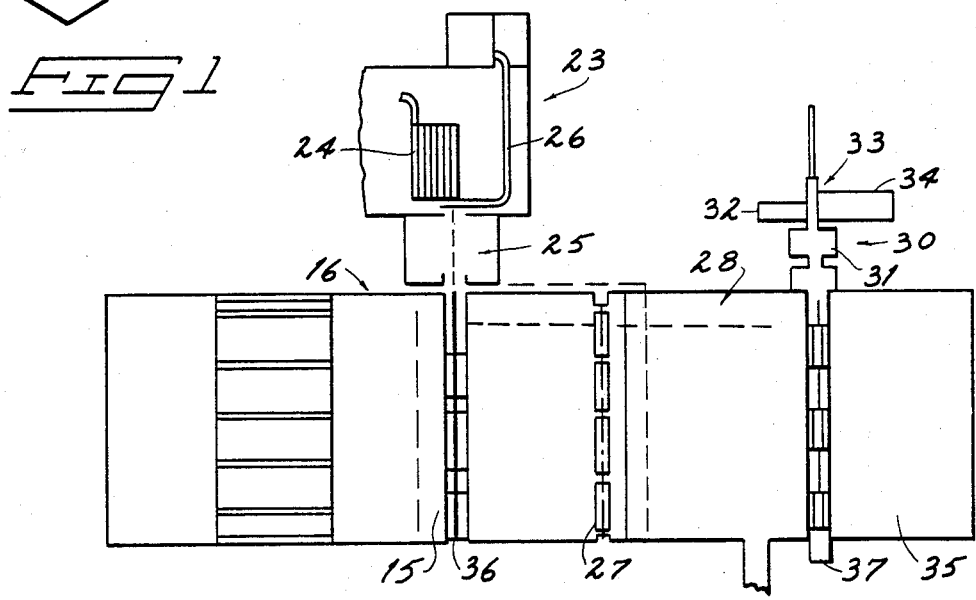
FIG. 2 is a simplified plan view of the apparatus.

Referring to the flow path shown in FIG. 1 and the associated schematic plan view shown in FIG. 2, the general steps of the process carried out by this system can be outlined. The uppermost box 1 in FIG. 1 indicates the step of fabricating the fuel pin subassembly, which is accomplished outside the scope of the present system. Box 2 of the flow diagram represents the loading or feeding of the fabricating fuel pin subassemblies into the system. This is accomplished by a cladding loader 15 comprising a suitable gravitational hopper for individually directing the lengths of fuel cladding 10 into a gravity feed conveyor shown generally at 16. The gravity feed conveyor directs parallel lengths of fuel cladding 10 from one station to the next in this system.

The individual lengths of fuel cladding 10 are next loaded with fuel pellets as required by the reactor for which they are designed. This general step is represented by box 3 in the flow diagram. It is accomplished at a pellet loading station 23. The pellet loading station 23 is environmentally isolated from the remainder of the equipment in order to prevent radioactive contamination of the conveying and handling elements which necessarily contact the fuel cladding 10. To assure against contamination, the filled lengths of fuel cladding 10 are cleaned and temporarily plugged, steps represented by box 4 in the flow diagram. These steps are carried out in a cleaning and capping unit 25 at the entrance/exit of the pellet loading station 23.

Final assembly of the fuel pin is represented by box 5, and is accomplished in an inerting enclosure 28 and welding station 30. The gas within the fuel cladding 10 is displaced by a desired inert atmosphere, the interior components of the fuel pin assembly are loaded adjacent to its open end, and the open end is sealed by a welded cap.

The boxes 6 and 7 in the flow diagram represent inspection and release steps carried out in addition to the steps of this system prior to actual usage of the fuel pins.

To complete the discussion of FIG. 2, it further represents a pellet loading tray 24 included within the pellet loading station 23. The loading tray 24 arranges individual pellets in elongated rows for insertion within individual lengths of fuel cladding. Also provided within the pellet loading station 23 is a funnel handling unit 26 which receives the funnels 12 after removal from each length of fuel cladding 10. It maintains the funnels in a guarded environment for subsequent disposal.

Interspersed along the length of the gravity feed conveyor 16 are two cladding transports 36 and 37 aligned alongside the pellet loading station 23 and the welding station 30, respectively. Transports 36 and 37 basically position individual lengths of fuel cladding 10 for axial movement relative to the gravity feed conveyor 16. They also have the capability of imparting rotational movement to the fuel cladding 10 for rotation about their individual longitudinal axes. Axial and rotational movement of the cladding is coordinated with the functions of the equipment operating at the open end of the length of fuel cladding 10 during the steps carried out within this system.

An accumulator 27 is arranged between transport 36 and the inerting enclosure 28. The accumulator gathers a relatively large number of loaded lengths of fuel cladding, which are then fed as a batch into the inerting enclosure 28.

Figure 3:
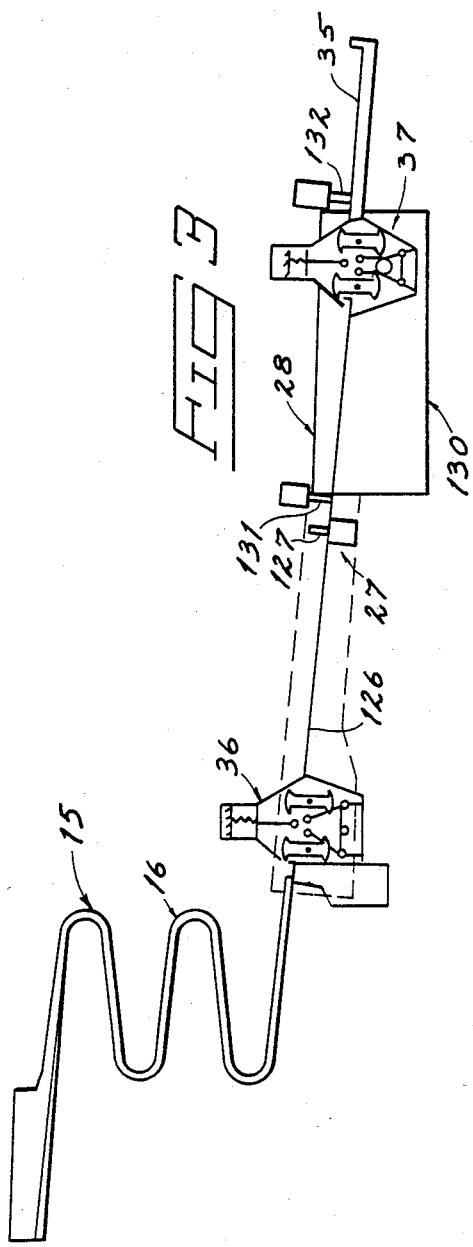
FIG. 3 is a schematic elevational view of the apparatus.

After the pellet loading process and cladding cleaning steps have been accomplished by the equipment generally shown in FIG. 2, the fuel pin subassemblies are individually removed from transport 36 and are permitted to roll along the receiving guide supports 126 of gravity feed conveyor 16 to a solenoid operated transverse stop 127 (FIG. 3). Stop 127 acts as an accumulator to gather the requisite number of fuel pin subassemblies for an inerting sequence.

Inerting of the fuel pin subassemblies is accomplished in a batch sequence. It is performed within a rectangular pressure vessel schematically shown at 130. The inlet to the vessel 130 includes a solenoid actuated sealable door 131. A similar door 132 is provided at its outlet. The gravity feed conveyor, which extends through the vessel 130, maintains a minimum nuclear cross section from a criticality viewpoint. However, other arrangements of the inerting vessel are capable of being substituted in the system, such as a barrel arrangement set to one side of the principal conveyor path.

After the predetermined charge of fuel pin subassemblies is contained within the pressure boundaries of vessel 130, the vessel and its contents can be evacuated and backfilled with the desired inerting gas. In a typical operational system, several hundred fuel pins might be inerted in a single batch, and the process might require several hours. Multiple vessels 130 can be interchanged within the system, depending upon production speed requirements. It should be noted that during the evacuation process, contamination by gas removal from the fuel pin subassemblies is prevented by removable filter plugs 115.

The welding station 30, as shown schematically in FIG. 2, includes a welder 31, an end hardware loader 34, and an end cap feeder 32. Various components which must be directed into or onto the open end of each length of fuel cladding prior to welding of an end cap are moved into place by a barrel loader, generally shown at 33.

To complete the system, fuel pin storage facilities 35 are provided downstream from transport 37 (FIG. 2). They are arranged to receive the completed fuel pins, holding them for subsequent inspection and eventual release.

Figure 4:
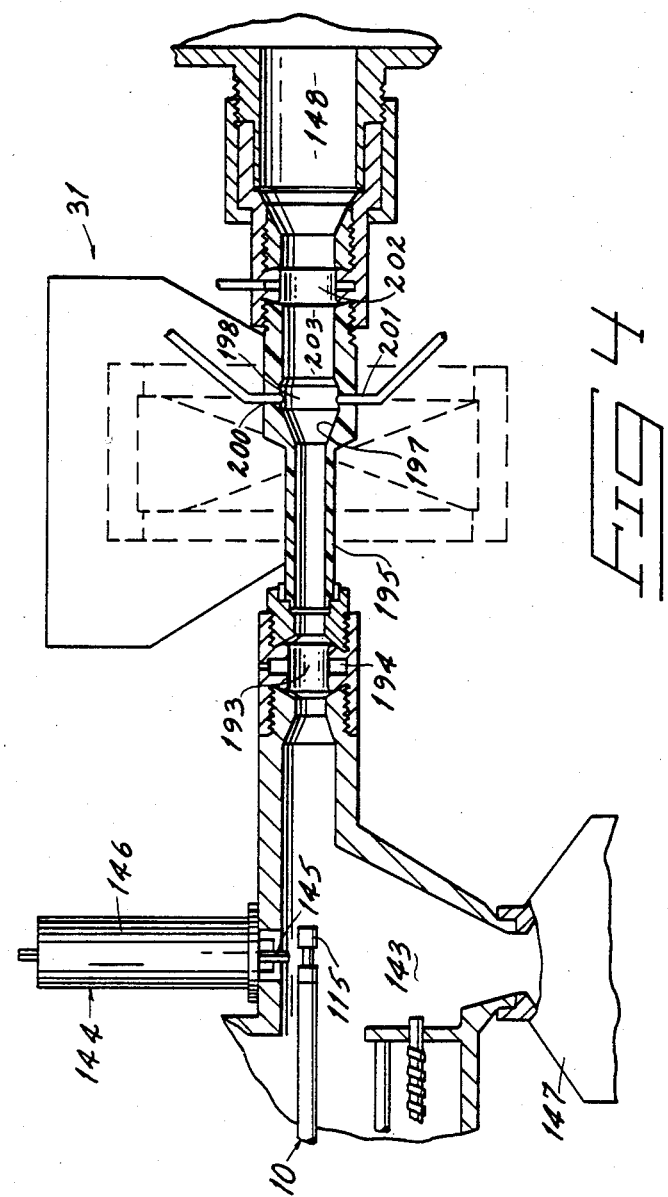
FIG. 4 is a view of a pulsed magnetic welder adapted for use with the system.

The following detailed description of the welder 31 and barrel loader 33 can best be understood by reference to the welder details in FIG. 4 and the loader assembly and subassembly details in FIGS. 5-8.

Following the inerting procedures, each fuel pin subassembly is directed to transport 37, which supports the cladding 10 for axial transverse movement relative to the gravity feed conveyor and for rotational movement about the cladding axis. While the cladding is positioned by transport 37, the filter plug 115 is removed, the reflector assemblies (if any) are inserted within the cladding, and an end cap is welded at the open end of the cladding to complete the fuel pin assembly.

As shown in FIG. 4, the incoming cladding 10 is directed by the supporting transport 37 to a sealed chamber 143 in communication with the inerting vessel 130. The transport 37 first positions the filter plug 115 directly beneath a retractable end plug remover 144. The end plug remover 144 includes a downwardly open C-clamp 145 which is complementary to an annular groove formed about the exterior of the filter plug 115. A solenoid or air cylinder 146 is selectively operable to position C-clamp 145 about the plug 115 with the surfaces of the C-clamp 145 engaging the shoulders of the plug groove. Transport 37 can then be operated to retract cladding 10, which allows plug 115 to fall into a capture tube 147.

After removal of filter plug 115 has been completed, transport 37 is operated to axially shift the open end of cladding 10 into the welder 31.

A pulsed magnetic welder 31 is shown in FIG. 4. It utilizes a ring loader exemplified by the device shown in FIG. 7 and an end cap loader illustrated in FIG. 8. The details of the welding sequences are shown in FIGS. 9 and 10.

Referring to FIG. 4, an opening is provided in communication with the interior of chamber 143 through an inflatable seal 193. This seal includes a flexible circumferential membrane that is selectively urged radially inward by pressurized air directed about an annular groove in a supporting sleeve 194. Seal 193 is capable of isolating the environment within chamber 143 from the environment within the welder. It includes a yieldable membrane which can be pressurized by air detected about a surrounding groove. Seal 193 is also utilized to seal off the interior of the welder 31 and barrel loader 33 from enclosure 28 during inerting operations. This can be accomplished by feeding a dummy pin into the welder and operating seal 193 to thereby close off the entrance into the inerting enclosure 28. By providing each batch of fuel pin assemblies with a final dummy pin for this purpose, the necessity of carrying out the inerting steps throughout the greater volume of the welder and loading equipment is prevented. After inerting has been accomplished, seal 193 can be relaxed. The atmosphere within the welder and loading equipment will be maintained as an inert atmosphere at all times.

The welder 31 is this instance comprises a conventional pulsed magnetic welder of a cylindrical nature (FIG. 4). It is arranged coaxially about an enclosure shown in the form of a tube 195 having an inner diameter capable of receiving the cladding 10.

In order to effect a weld by magnetic pulse, it is necessary to place a ring of curie metal about the area on cladding 10 which is to be welded. The magnetic material of ring 217 is thereby collapsed about the cladding as a result of the magnetic pulse produced by the welder. The resulting inward movement of the cladding surfaces causes development of a cold weld at the end of the cladding.

With the open end of cladding 10 located within the tube 195, various barrel loaders can be directed through the welder 31 and into chamber 143 for placement of reflectors, tag gas capsules (if used) and other internal and external elements required to complete assembly of the fuel pin.

Figure 5:
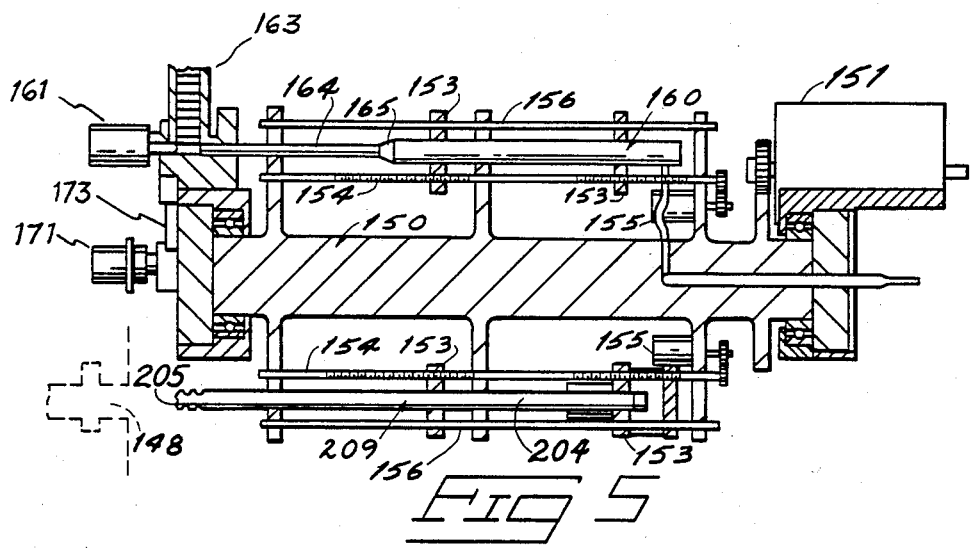
FIG. 5 is an axial sectional view of a barrel loader.

General details of a barrel loader for inserting reflectors and end caps are shown in FIG. 5. A rotatable barrel frame 150 is shown supporting a reflector loader 160 and a diametrically opposite end cap loader 209. The details of loaders 160 and 209 are shown respectively in FIGS. 6 and 8.

Loaders 160 and 209 are mounted on the barrel frame 150 for free rotation about their individual axes, as well as for reciprocating movement parallel to their respective axes. The guides 164 and 204 include integral supporting bearings 153 which surround them and receive threaded lead screws 154 powered by longitudinal drive motors 155 operably connected to them by suitable drive gears. The bearings 153 also receive stationary guide rods 156 which stabilize their longitudinal movement as imparted by rotation of the respective lead screws 154. Each of the loaders 160 and 209 are movable between a retracted position, as shown in FIG. 5, and an extended operational position at which the shoulders 165 or 205 abut the interior of the welder inlet 148.

The barrel frame 150 is rotatably supported about an axis parallel to the axes of the loaders 160 and 209. It can be indexed about its axis to coaxially align alternate loaders along the axis of welder inlet 148. The loader 160 is alternately aligned coaxially with a reflector injector 161 which receives reflectors 162 from a reflector hopper 163. Similarly, the end cap loader 209 can be indexed about the axis of the barrel frame 150 to align it coaxially with an end cap injector 171 which receives end caps 213 from a hopper 173 located to the rear of the view shown in FIG. 5.

Figure 6:
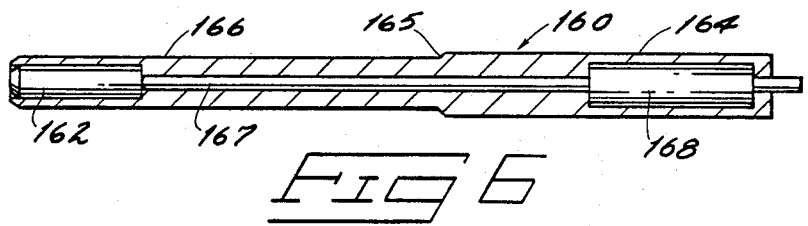
FIG. 6 is an enlarged axial sectional view of an apparatus for inserting a reflector or other component into a fuel pin.

The reflector loader 160 comprises a tubular guide 164 having a shoulder 165 complementary in size and shape to the interior of the welder inlet 148, as shown in FIG. 6. A coaxial extension 166 protrudes from guide 164 and is insertable within the cladding 10. It includes an outer cavity which frictionally holds a reflector 162 for insertion purposes. A reciprocable plunger 167 is powered by a double acting pneumatic cylinder 168 operatively connected to a source of air mounted on the barrel frame 150.

After the filter plug 115 has been removed from the outer end of cladding 10 by operation of C-clamp 145 and the open end of cladding 10 is positioned within tube 195, the barrel frame 150 is rotated by barrel drive 151 to properly index the reflector loader 160 in a coaxial position aligned with the welder inlet 148. The loader 160 is then shifted along its axis to bring shoulder 165 into engagement with the interior of inlet 148. At this time, the extension 166 will protrude to the open end of cladding 10, previously positioned within the welder 31. Extension 166 locates reflector 162 inwardly from the open end of the cladding, leaving clearance between the reflector and the subsequently added end cap 213. Reflector 162 is then injected into the cladding 10 by operation of cylinder 168 and plunger 167. After retraction of plunger 167, the reflector loader 160 is reciprocated clear of the welder inlet 148, and barrel frame 150 is again indexed by operation of barrel drive 151.

Ring 217 is loaded on a guide 218 having a tapered nose 220 adapted to center the guide 218 coaxially in the open end of cladding 10 (FIG. 7). A radial shoulder 221 is adapted to abut the outer end edge of the cladding. The welding ring 217 can then be pushed onto the cladding by an abutting welding ring compressor 223. The welding ring compressor 223 is an extension of a loading rod 224 which is mounted to the barrel loader in the same manner as are the 160 and 209 loaders. It is movable axially relative to the barrel loader and relative to the welder.

One significant advantage of using pulsed magnetic welding techniques for closing the end of the fuel pin is that the welding can take place within a very confined area in tube 195. Because of the relatively small excess volume required in the welding area of this equipment, relatively expensive tag gas for identification of a fuel pin can be directed into tube 195 and the open end of cladding 10 prior to welding. This eliminates the fabrication and handling expenses of the usual tag gas capsules that are typically placed in the fuel pins and subsequently ruptured. The tube 195 includes a tapered shoulder 197 leading to an enlarged diameter groove 198 provided with a connection 200 for entrance of tag gas and a connection 201 for application of vacuum pressure. The connections 200 and 201 permit introduction of any gaseous environment desired, and alternation of the introduction of gas and vacuum pressure.

The area within the welder 31 is sealed by operation of seal 193 and a second inflatable seal 202. The diameter of seal 202 is complementary to the outer diameter of the bottom end cap loader used in conjunction with this equipment. The outer end of tube 195 is open and serves as a welder inlet. It is identified by the reference numeral 203.

The end cap loader 209 provides for introduction of tag gas directly in the weld area. The guide 204 has an extension sleeve 211 slidably mounted over its outer end biased outwardly by a compression spring 212 wrapped about guide 204. Spring 212 normally maintains the sleeve 211 in the extended position shown in FIG. 8. In this position, the fuel pin end cap 213 is retracted within the outer end of sleeve 211. The sleeve 211 includes apertures 214 which permit entrance of tag gas to the interior of sleeve 211. The sleeve 211 and guide 204 are sealed with respect to each other and with respect to shaft 207 by seals shown at 215 and 216.

After the end cap loader has received and gripped an end cap 213, it is positioned coaxially with the welder inlet and shifted axially until the outer end of sleeve 211 engages the tapered shoulder 197 within tube 195. Seal 202 can then be engaged about sleeve 211, thereby defining a small volume sealed area between the seal 193 that encircles cladding 10 and the seal 202 that encircles sleeve 211. Tag gas is added to the atmosphere within the welder through the connection shown at 200.

After addition of the tag gas, the barrel loader shifts the shaft 207 and end cap 213 into welding position within the open end of the cladding (FIG. 9). An outwardly tapering surface formed on the end cap 213 is located radially inward of the ring 217. Ring 217 is collapsed about the cladding 10 and end cap 213 by a strong momentary magnetic pulse. The acceleration of the cladding as it collapses about the tapered surface on end cap 213 creates a cold weld at the outer edge of the cladding, sealing the cladding to the solid metal end cap 213 (FIG. 10). The collet fingers 206 can be released and end cap loader 209 can be retracted from the welder inlet to complete the welding sequence.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments discussed in detail were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An automated closure system for nuclear reactor fuel assemblies, comprising:
   a sealable enclosure in the form of a double-ended hollow cylindrical tube having an inner diameter capable of receiving a length of cladding;
   transport means for coaxially positioning a length of cladding within said tube by axially shifting an outer open end of the length of cladding through one end of the tube;
   means movably mounted relative to the remaining end of the tube for placing a ring of curie metal coaxially about the outer open end of the length of cladding within the tube;
   end cap loading means movably mounted relative to the remaining end of the tube for coaxially positioning an end cap partially within the outer open end of the length of cladding while positioned within the tube;
   and cylindrical pulsed magnetic welding means arranged in a fixed position coaxially about said enclosure, adapted to seal the outer open end of the length of cladding while positioned within the tube by selectively collapsing the ring of curie metal about the cladding and the end cap positioned within it.

2. The apparatus of claim 1 wherein the tube has releasable cylindrical seals at each end thereof for selective sealing engagement about outer surfaces of the end cap loading means and the length of cladding when its open outer end is received within the tube, respectively.

3. The apparatus of claim 2 further comprising: means in communication with the tube interior at a location between said seals for evacuation and introduction of gaseous materials to the tube interior and the length of cladding when its open outer end is received within the tube.

* * * * *